UNITED STATES PATENT OFFICE.

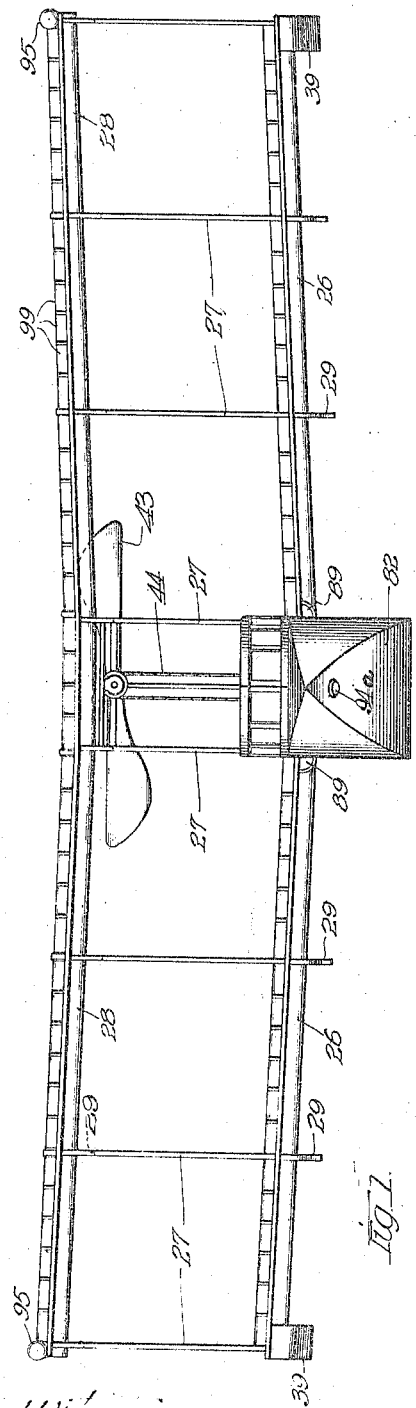
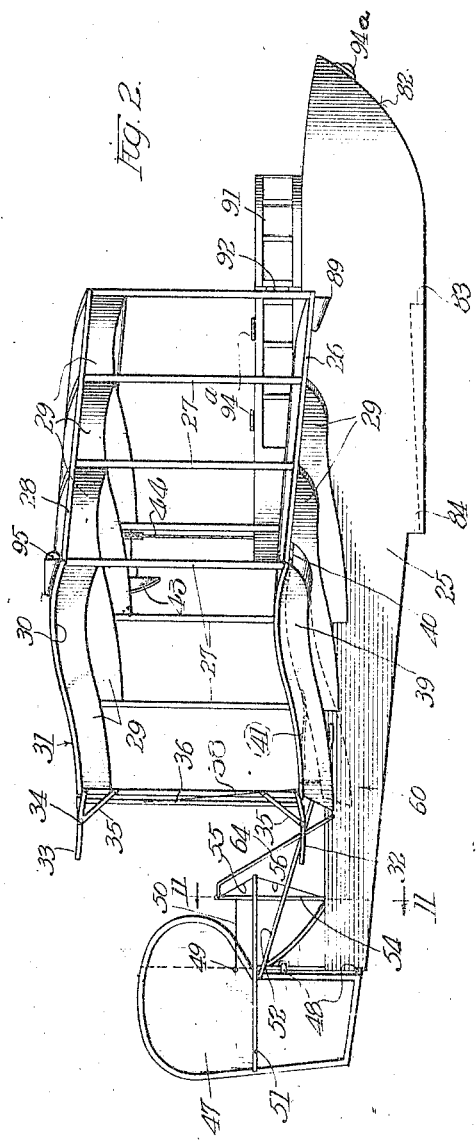

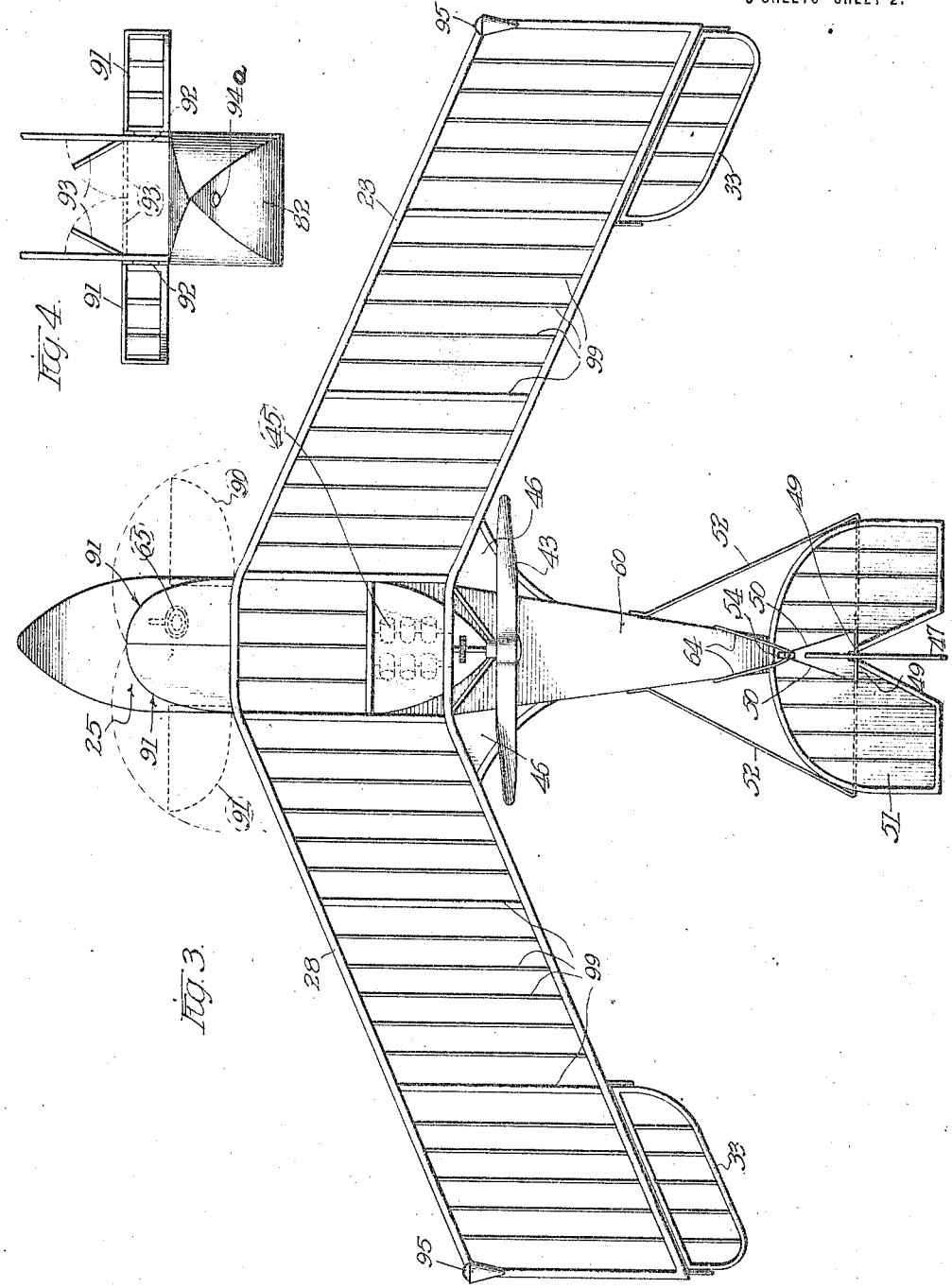

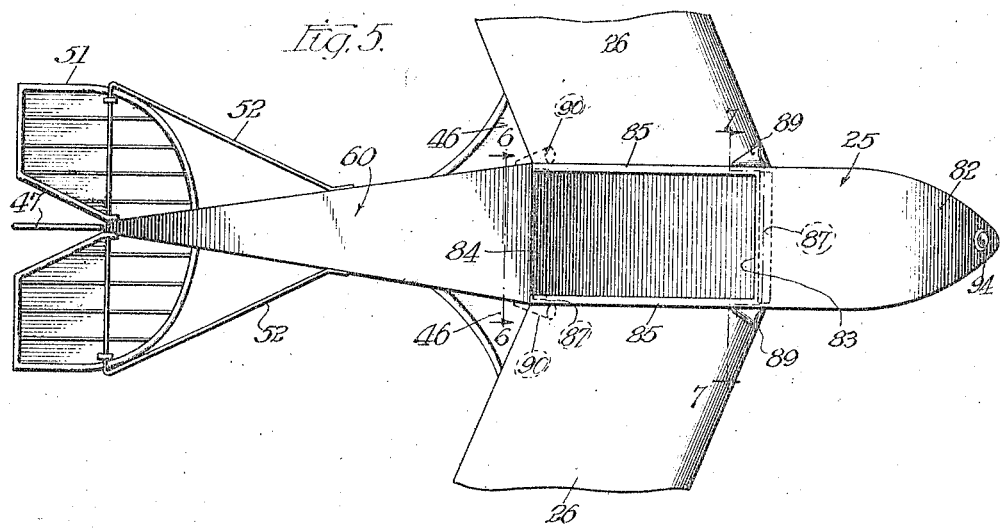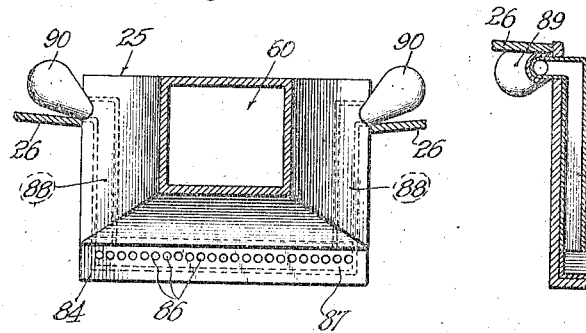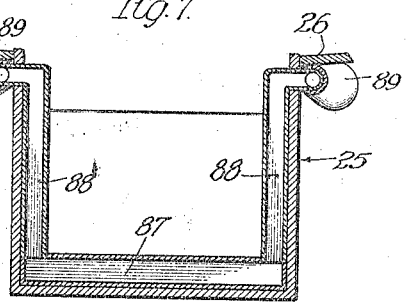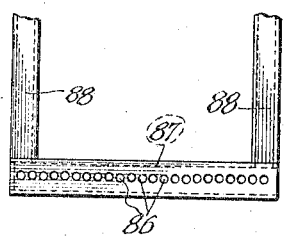

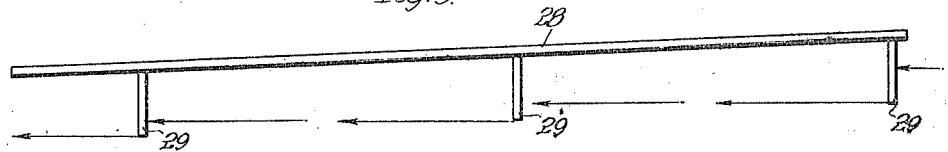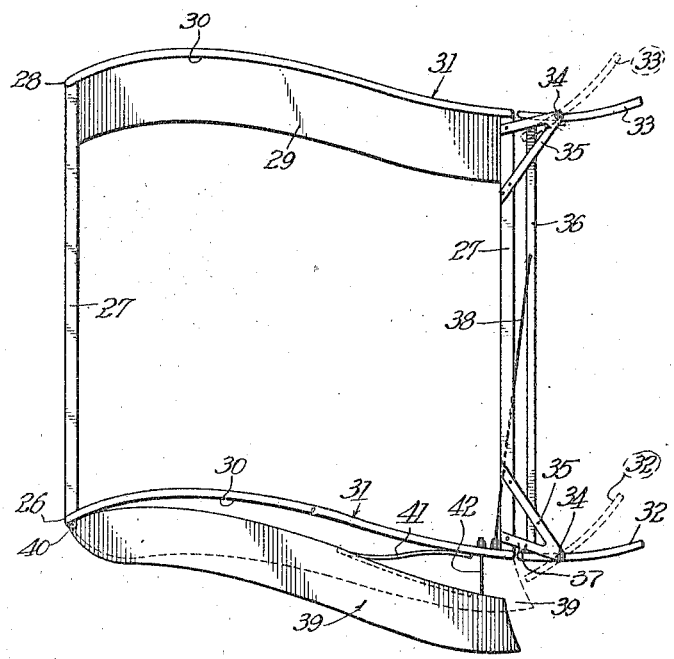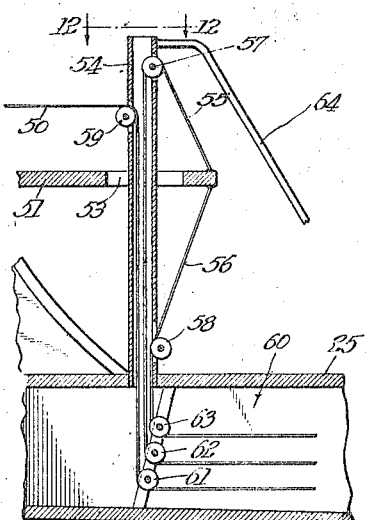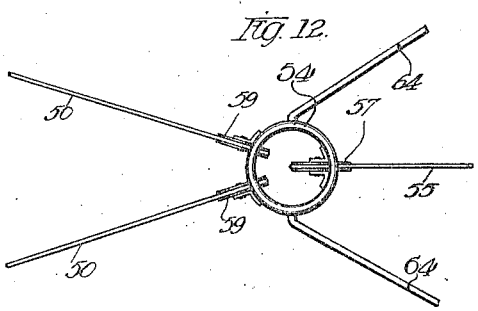

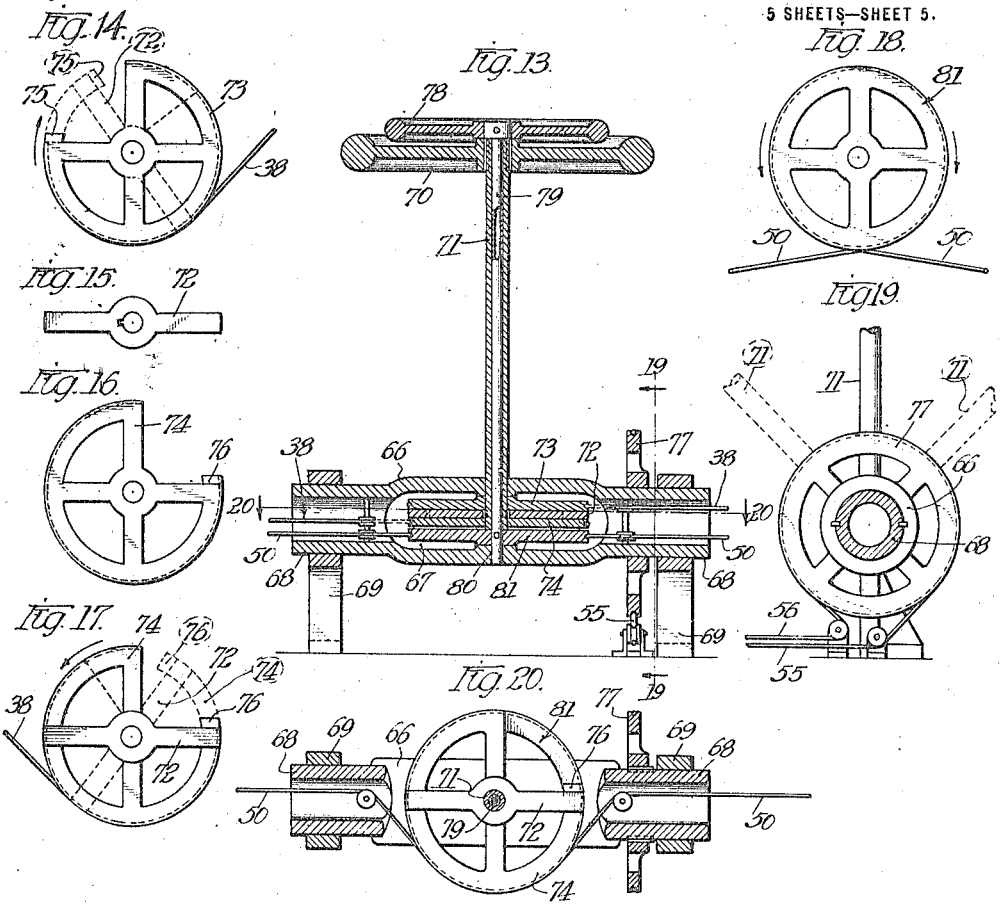

THOMAS P. BROOKE, OF CHICAGO, ILLINOIS, ASSIGNOR TO THE BROOKE AIRCRAFT COMPANY, A CORPORATION OF DELAWARE.

WING FOR AEROPLANES, FLYING-BOATS, &c.

1,264,485.

Specification of Letters Patent.

Patented Apr. 30, 1918.

Application filed October 31, 1913. Serial No. 798,392.

*To all whom it may concern:*

Be it known that I, THOMAS P. BROOKE, a citizen of the United States, residing at Chicago, in the county of Cook and State of Illinois, have invented certain new and useful Improvements in Wings for Aeroplanes, Flying-Boats, &c., of which the following is a specification.

This invention relates to improvements in wings for aeroplanes, flying boats, etc., and one of the objects of the invention is to improve, simplify and strengthen the construction of the same, with a view to increasing to a maximum, the efficiency, as well as the directional stability and safety thereof, and at the same time develop in the planes inherent tractor force of soaring birds, whereby the wings will have an upward and forward pull while in flight, thereby reducing to a minimum the power necessary to propel the machine.

A further object of the invention is to provide an improved machine of this character having means for overcoming excessive dangerous oscillation of the machine, and for preventing the upsetting thereof, by the wind pressure, while the machine is in flight.

A further object is to provide an improved body construction for the wings and surfaces of the machine.

To the attainment of these ends, and the accomplishment of other new and useful objects as will appear, the invention consists in the features of novelty in substantially the construction, combination and arrangement of the several parts, hereinafter more fully described and claimed, and shown in the accompanying drawings illustrating the invention. In the drawings the wings are shown as being connected with a boat body, but it is to be understood that they are equally well adapted for use in connection with any form of aeroplane, whether biplane, monoplane, triplane or the like. In the drawings—

Figure 1 is a front elevation of a form of air craft having wings constructed in accordance with the principles of this invention connected therewith.

Fig. 2 is a side elevation of the parts shown in Fig. 1.

Fig. 3 is a top plan view of Figs. 1 and 2.

Fig. 4 is a detail front elevation of the front portion of the body or car of the machine showing some of the parts in different positions.

Fig. 5 is a bottom plan view of a portion of the machine.

Fig. 6 is a detail sectional view taken on line 6—6 Fig. 5.

Fig. 7 is a detail sectional view taken on line 7—7 Fig. 5.

Fig. 8 is a detail elevation of one of the air chambers in the body of the machine.

Fig. 9 is a detail diagrammatic view of one of the planes or wings.

Fig. 10 is a detail elevation of the ends of the wings or planes.

Fig. 11 is a detail sectional view as taken on line 11—11 Fig. 2.

Fig. 12 is a detail view as taken on line 12—12 Fig. 11.

Fig. 13 is a sectional view of the tiller or control for the tail plane, rudder and ailerons.

Figs. 14, 15, 16, 17, and 18 are plan views of details of the control.

Fig. 19 is a detail sectional view on line 19—19 Fig. 13.

Fig. 20 is a detail sectional view taken on line 20—20 Fig. 13.

Fig. 21 is a top plan view of the control, showing the cables connected therewith.

Fig. 22 is a plan view with parts broken away showing the details of construction of the planes surfaces.

Fig. 23 is a sectional view as taken on line 23—23 Fig. 22.

Referring more particularly to the drawings and in the present exemplification of this invention, the numeral 25 designates generally the boat body or supporting structure which may be of any desired size and configuration. Projecting laterally from opposite sides of the body are planes 26 and supported above these planes 26, by means of suitable uprights 27, and parallel thereto are similar planes 28, and these planes are arranged so as to form rearward dihedral angles, the latter being at substantially 180 degrees. By the use of the rearward dihedral angles, a greater range or shifting of the center of gravity of the machine may be obtained, without affecting the longitudinal stability of the machine.

The wings or planes 26, 28 are of a single surface formation, with both faces constructed on the same curves, parallel and close together so that the entire wing will be thin and at the same time light, rigid and strong in construction. That is to say, each of the wings embodies a body portion comprising a frame having braces or ribs 99 incorporated therein, and which ribs are parallel and extend lengthwise of the frame, and to the lower faces of this frame, thus formed, the rigid wing surface is secured. In order to produce such rigidity and at the same time produce a wing body which will not be distorted or change its form after once being shaped, so as to always insure a maximum and uniform efficiency, the wings and surfaces are preferably of a veneer construction.

Each wing surface comprises a series of laminations, the laminæ 96, 97 being constructed preferably of tough paper or any other fibrous material, while the inner lamination is preferably constructed of fabric. All of these parts are firmly secured together by suitable fastening means, such as glue, cement or the like, and result in a construction which possesses, as nearly as possible, the rigidity of metal.

With this construction it will be manifest that an effective and rigid single surface wing may be produced and is more advantageous than a soft distortable surface, such as fabric or the like, inasmuch as any soft or distortable surface, by being distorted loses a greater part of its efficiency.

The wings or planes are so shaped that an upward and forward pull will be exerted at the front of the wing, while the rear of the wing is shaped, that in conjunction with the rearward dihedral angle thereof, the action of the air on the wing while in flight, will cause the wing to automatically aright itself. To accomplish this, the front of the wing is shaped to preferably form a substantially 70 degree arc of a true circle, as designated at 30, the chord $30^a$ of this arc is of a length substantially equal to one-fourth of the wing chord. From the end $30^b$ of the arc chord, the wing extends at a tangent and substantially straight, as at $31^a$, to a distance substantially twice the length of the chord $30^a$ of the arc 30, and terminates in a slight negative up-turned curve 31, forming a rigid up-turned portion, and all combined to produce an upward lift and forward pull representing the inherent tractor force of soaring birds, and also a self-righting action to the wing. This structure also imparts to the wing a further and greater lifting capacity from the impact of the air currents on the under face of the tangent or straight portion $31^a$ of the wing, while the negative curve 31 serves the function of balancing or automatically arighting the wing.

It will be noted that by this construction of wing surface, there will be provided a deep camber close to the leading edge of the wing and on the under side thereof, with the result that the air currents will be deflected upwardly at a sharp angle. This will cause an area of low pressure or partial vacuum to be formed above and close to the leading edge of the wing, thereby causing the wing to be drawn or sucked in an upward or forward direction, thereby reducing to a minimum the power or force necessary to propel the machine.

By virtue of the rearward dihedral angle of the wings, the entire up-turned or negative rigid curved portions of the rear of the wing stand back of the meta-center of the machine.

Should the propelling force for any reason fail, the machine will, by virtue of this shape and arrangement of the wings, automatically assume a forward gliding angle, and the machine will be drawn forwardly and downwardly by the force of gravity with ever increasing speed, until the pressure of the horizontal air currents upon the rigid up-turned rear portions of the wings, which latter have by such action of the machine been elevated to be presented to a greater angle to the horizontal air currents, automatically depress the rear of the wings, turning them about the lateral meta-center of the machine, to elevate the leading edges of the wings, to cause the wings to be returned to a horizontal position.

The momentum gained by this gliding action is expended in a forward and horizontal direction and the above action is repeated until the machine reaches the ground.

The lateral stability or self-righting effect is produced in the wings by the use of a multiplicity of narrow rigid vertical fins, which project or depend from the lower faces of the wings and extend across the plane surface in the direction of the path of flight, while at the same time they are spaced laterally from each other in a direction longitudinally of the wings as shown more clearly in Figs. 2 and 9.

The lower edges of the fins may be straight or may conform to the contour of the wings as shown in the drawings.

These fins prevent the dangerous oscillation caused by the pressure of the wind rushing off or escaping alternately from the ends of the wings from the inside, and of the side gusts of air from the outside, while rushing in under the wings, which would have a tendency to upset the machine.

The fins are so arranged that when the wings are tipped laterally, the lower extremity of each fin will terminate short of the plane of the lower extremity of the next adjacent fin on the side thereof adjacent the body of the machine, as shown more clearly in Fig. 9.

These fins form obstructions for the side gusts of air so that these air currents beneath the planes or wings, instead of directly striking the under surface of the wings with considerable force, tending to raise the wings or planes, will first strike the fins as shown by the arrows in Fig. 9 and will pass from one fin to the other acting upon the fins to cause the planes or wings to be lowered instead of raised, thereby overcoming the dangerous oscillation of the machine and the tendency of the side gusts of air to upset the machine.

The fins also serve to increase the directional stability of the machine, and prevents skidding or side-slipping of the machine during the turning of the machine.

The lateral stability or self-righting action of the wings is obtained by these fins in conjunction with the short downwardly curved portion at the top of the leading edge of the wings, as any sudden gusts of wind attacking the wing from the side will, owing to the backward dihedral angle of the wing, strike the top of the downwardly turned edge of the wing and will assist the fins in preventing the rising action of the wings.

By the use of such fins, the wings may also be arranged in upward dihedral angles with safety.

Arranged at the rear of each of the wings or planes. 26—28 and at their outer extremities, are rigid ailerons 32—33 which are preferably pivoted intermediate their ends as at 34 upon suitable supports 35, preferably in a manner that they will be counterbalanced, and the ailerons on the respective sides of the machine are connected in pairs to move in unison, by means of a suitable connecting element 36. The ailerons are preferably curved and so shaped that when in their normal positions as shown in Fig. 10, the curves thereof will coincide with the adjacent curved portions of the wings so as to form continuations of the curves of the respective wings or planes and thereby further assist in arighting the wings. A suitable stop 37 is provided for the ailerons to prevent their rear edges from being depressed below their normal positions, with respect to the planes or wings, but they are free to be raised above their normal positions and into the positions shown by the dotted lines in Fig. 10. When the ailerons are in their normal positions, or the position shown in full lines in Fig. 10, there is a slight downward or negative air pressure thereon. With this construction and arrangement of the ailerons, the outer or fast traveling wing or plane, in turning, will be unobstructed, that is, there will be no additional "drag" upon the wing as heretofore, thereby allowing the machine to turn on a short curve, or a more level keel than heretofore. This is due to the fact that in turning, the outer aileron is maintained in normal position with respect to the wing or plane, while the inside aileron, or the aileron adjacent the point of turning, is raised with respect to its wing to cause the air pressure to depress that wing, causing the high wing to be unobstructed while the "drag" will be exerted on the inner or lower wing.

Heretofore, it has been customary in turning, to deflect the ailerons or warp the wings, and the ailerons and wings have therefore been so constructed, as to permit them to be deflected or warped in opposite directions; that is, when it has been desired to turn, the outer aileron or extremity of the wing has been depressed, while the inner aileron or extremity of the wing has been raised. This results in equal "drag" on both of the wings, with the further result, that a dangerous angle is necessarily assumed by the machine when making a turn.

Obviously, the ailerons instead of being pivoted intermediate their ends and counterbalanced as shown in the drawings, may be hinged to the rear edges of the wings or planes, or they may be set into the wings or planes.

The ailerons are preferably moved about their pivots by means of a cable or rope 38 which latter is carried to any suitable point convenient to the operator.

Arranged adjacent the outer extremities of the lower wings or planes 26, are pontoons 39 which serve to support the outer extremities of the wings when the machine is riding upon the water. These pontoons 39 may be of any desired size and shape, but preferably conform to the contour of the wings or planes, and also to the fins 29, so that when the machine is in flight, they serve the additional functions of deflectors or fins for the side air gusts and coöperate with the fins 29 for controlling and directing such currents.

The pontoons may be secured in position in any suitable manner, but they are preferably connected to the adjacent wings or planes by means of a pivot 40, arranged adjacent the forward extremity thereof, so that the pontoon may move about the pivot in a direction toward and away from the plane, and if desired, an elastic member 41, preferably in the form of a spring may be provided between the wing and pontoon, which tends normally to move the pontoon in a direction about its pivot, away from the wing. A cable 42 or other suitable device may be provided for drawing the pontoon against the wing and against the stress of the elastic member 41, so that the pontoon will act as a fin or obstruction to the air currents rushing in under or off of the end of the wing while the machine is in flight. By thus mounting the pontoons 39, they may be released and allowed to be moved away from the wing surface, while the machine is descending, so that when it rides upon the water, the pontoons serve as shock absorbers.

The propeller 43 is arranged at the rear of the machine, and preferably within the angles formed by the planes or wings, and this propeller is driven in a suitable manner, such as by means of the driving chain or belt 44, from the motors 45, arranged within the body 25 of the machine, thereby dispensing with the necessity of mounting the motors upon a super-structure, and the propeller may be any desired or approved type. In order to protect the ends of the propeller during rotation, webs or guards 46 are provided which extend across the space formed between the adjacent portions of the rear portion of the body 25, and the wings or planes 26, as shown more clearly in Figs. 3 and 5.

The body 25 is preferably of a length to project some distance beyond the rear edges of the wings or planes, and preferably tapers from the bow to the stern. The rudder 47 is arranged uprightly, and is preferably counterbalanced so as to move about pivots 48, and arms 49 project laterally beyond the rudder, and to which arms cables 50 are connected which lead to a point convenient for the operator, for swinging the rudder about its pivot. A horizontal tail plane 51 is supported by means of a brace or frame 52, adjacent the stern of the machine and is provided with an aperture or opening 53 through which a tubular upright 54 passes, and connected with the tail plane 51, are cables 55—56 for swinging the tail in opposite direction about its pivot. The cable 55 extends into the tubular member 54, and the cable 56 also extends into the tubular member 54 over a pulley 58, while the cables 50 extend into the tubular member 54 over pulleys 59, thereby housing all of the cables to conceal them and prevent them from fouling. The stern of the body 25 is preferably tubular, as at 60, and the cables 50, 55 and 56 pass respectively over the pulleys 61, 62 and 63 to extend through the tubular portions of the body to a convenient point for the operator. Obviously suitable braces and supports 64 may be provided for the tubular member 54.

The body 25 is constructed to form adjacent the forward part thereof, a cabin within which is arranged a control or tiller, designated generally by the numeral 65 in Fig. 3, and to which the various cables for controlling the ailerons, the rudder, and the tail or elevating planes are connected. The controlling mechanism consists primarily of a body 66 having a recessed portion 67 with tubular extremities 68. These extremities are journaled in suitable bearings 69, and a tiller wheel 70 having a stem 71 is provided for rocking the body 66 in its bearings. The stem 71 projects into the body 66 and is rotatable therein, and secured to the stem, within the recessed portion 67 of the body is an element 72 comprising arms which project laterally from the stem 71, and journaled loosely upon the stem 71, within the recessed portion of the body, and upon opposite sides of the element 72, are elements 73, 74 which latter elements may be of any desired configuration, but are preferably in the form of disks having portions of their peripheries cut away, and each being provided with circumferential grooves in their peripheries which receive the cables 38 of the ailerons, the cables from each aileron being secured to one of the elements, 73, 74.

The element 73 is provided with a downwardly projecting lug 75, standing on one side of one of the arms of element 72, while the element 74 is provided with an upwardly extending lug 76 standing on the opposite side of the other arm of the element 72, so that when the stem 71 is rotated by means of the tiller wheel 70, one of the arms of the element 72 will engage the projections of the elements 73, 74 according to the direction of rotation of the wheel 70, and at the same time the other arm of the element 72 will move away from the other projection, and the cables 38 are attached to the respective elements 73, 74 in such a manner that one or the other of the ailerons will be raised while the other aileron will not be affected by such movement of the tiller wheel. Obviously when the tiller wheel 70 is rotated in the opposite direction, the aileron which has been raised will be permitted to lower, while a continuation of the movement of the wheel in the same direction, will raise the other aileron, as will be understood.

The cables 38 from the ailerons pass through the tubular extremities 68 of the body 66 and over suitable pulleys to position them to be secured to the respective elements 72, 73.

Secured to rock with the body 66, preferably to one of the tubular extremities 68, and within the bearing 69, is a disk or drum 77, which is provided with a grooved periphery into which the cables 55, 56 pass, and which cables are secured thereto, so that when the member 66 is rocked in its bearings by moving the tiller wheel 70 forwardly or backwardly, the cables 55 or 56 will be adjusted so as to raise or lower the tail or elevator plane 51, according to the direction of the movement of the body 66.

The rudder is controlled by another tiller wheel 78 which is preferably of a size smaller than the wheel 70 and is located adjacent the latter and in such a position that the operator when grasping the wheel 70, may likewise grasp the wheel 78, or if desired may grasp only the wheel 70 or the wheel 78. This wheel 78 is connected with the stem 79, which preferably telescopes with the stem 71, to extend therethrough, and is journaled in the body 66 by one extremity as at 80. A disk or drum 81 is secured to the stem 79 for rotation therewith, and this disk or drum 81 is preferably provided with a grooved periphery into which the cables 50 leading from the rudder extend, and which cables are secured to the disk or drum 81, so that the cable on one side of the rudder will be wound upon the disk or drum, while the cable connected with the other side of the rudder will be paid out from the disk or drum, to permit the rudder to be swung about its pivot in the desired direction. These cables 50 pass into the tubular extremities 68 of the body 66 over suitable pulleys.

Thus it will be manifest that the various parts may be adjusted and controlled by the respective movements of the controlling elements, and all of these parts are controlled by the hands of the operator, thereby dispensing with the necessity of levers or adjusting device, to be moved by the movements of the body, arms or feet of the operator, or the movement of his hands, leaving his body, arms and feet free.

The forward part of the body 25 is preferably curved upwardly as at 82, and the bottom of the body is shaped to form steps 83, 84, and a portion of the body is shaped to form side walls 85 between the steps. The upright portions of these steps are provided with a series of apertures or openings 86, and a chamber 87 is arranged in the body adjacent each of the series of openings. These chambers may be formed in any desirable or suitable manner, and leading therefrom are passages 88, which preferably project beyond the sides of the body into the open air, and the outer extremities of the passages are preferably flared to form funnel shaped entrances 89 for the forward passages, and funnel shaped entrances 90 for the rearward passages, so that when the machine is in motion, outside air will be forced into the passages, to the chambers 87, and from there, will be discharged through the openings 86 toward the stern of the body.

This will form streams of air discharging from these openings, the presence of which air prevents the formations of eddy currents or suction, commonly known as "drag", in the rear of the body during flight, and also serves the function of forming sheets of air bubbles upon which the body rests while riding upon the water, so that when the body is leaving the water, only a small forward surface of the bottom thereof rests upon the water, and as the air is fed into these funnel shaped openings, it will have considerable pressure and will be discharged with some force through the openings.

The cabin in the body is provided with a closure in the form of a roof, and this closure is so constructed that it may be readily opened and swung free of the cabin to permit a ready or hasty exit. The forward part of the closure preferably comprises two sections 90—91 having transparent openings therethrough, and are preferably hinged on upright pivots 92 on opposite sides of the body, so as to divide the roof of this portion into two sections, and which sections swing with the sections 91, and 92 to open the forward portion of the cabin. The roof of the rear portion of the cabin comprises two sections 93, which are hinged on horizontal pivots 94 and are adapted to be readily and quickly raised from the dotted line position to the full line position shown in Fig. 4 when desired. Thus it will be manifest that in order to open the cabin, all that is necessary is to swing the front sections 91 about their pivots, and raise the sections 93 of the roof covering the rear portion of the cabin, thereby forming a ready and unobstructed exit from the machine, and at the same time providing a body or cabin having a limousine effect.

A search light 94$^a$ may be provided through the inclined portion 82 of the bow of the body, and signal lights 95 may be provided at the outer extremities of the planes or wings.

While in the present exemplification of this invention, there is shown a preferred form of construction and arrangement of the various parts, it is to be understood that various changes may be made therein without departing from the spirit of the invention, and while the invention is disclosed as being applicable to biplanes, it is to be understood that it may as readily be applied to monoplanes, triplanes, quadroplanes or any other form of planes, with equal efficiency.

What is claimed as new is:—

1. A curved aeroplane wing having its body forming a deep camber adjacent the forward edge of the wing to a point adjacent the center of the wing chord, and terminating in a slight negative curve adjacent the rear edge of the wing, an aileron supported adjacent the rear edge of the wing for upward deflection with respect to the wing, said aileron forming a continuation of the adjacent curve, when in a normal position with respect to the wing, and means for preventing the aileron from being depressed or deflected below such normal plane.

2. A curved aeroplane wing having its body forming a deep camber adjacent its forward edge and a slight negative curve adjacent its rear edge, and fins conforming to the contour of and depending from and extending entirely across the lower face of the wing, said fins being arranged transversely with respect to the wing, the lower extremity of each fin terminating short of the lower extremity of the next adjacent fin on the side thereof adjacent the inner end of the wing.

3. A curved aeroplane wing having its body forming a deep camber adjacent its forward edge and a slight negative curve adjacent its rear edge and fins conforming to the contour and depending from and extending entirely across the lower face of the wing, said fins being arranged transversely with respect to the wing, and spaced laterally from each other in directions lengthwise of the wing, the lower extremity of each fin terminating short of the lower extremity of the next adjacent fin on the side thereof adjacent the inner end of the wing.

4. A wing for air crafts and the like, said wing embodying a body frame, a single rigid surface secured to the frame, the faces of which surface are parallel, and fins secured to and projecting below the lower face of the wing, the lower extremity of each fin terminating short of the lower extremity of the next adjacent fin on the side adjacent the inner end of the wing.

5. A wing for air crafts and the like, said wing embodying a body frame, a single rigid surface secured to the frame, the faces of which surface are parallel, and rigid fins secured to and projecting below the lower face of the wing, the lower extremity of each fin terminating short of the lower extremity of the next adjacent fin on the side adjacent the inner end of the wing.

6. A wing for air crafts and the like, said wing embodying a body frame, a single rigid surface secured to said frame, the faces of which surface are parallel, and rigid fins secured to and projecting below the lower face of the wing, said fins being arranged parallel in the direction of flight of the wings, the lower extremity of each fin terminating short of the lower extremity of the next adjacent fin on the side adjacent the inner end of the wing.

7. A wing for air crafts and the like, said wing embodying a body frame, a single rigid surface secured to said frame, the faces of which surface are parallel, and rigid fins secured to and projecting below the lower face of the wing, said fins being arranged parallel, transversely of the wing and spaced from each other lengthwise of the planes, the lower extremity of each fin terminating short of the lower extremity of the next adjacent fin on the side adjacent the inner end of the wing.

8. A wing for air crafts and the like, said wing embodying a body frame, a single rigid surface secured to the lower face of the frame, the rear of the wing terminating in a rigid curve, a counter-balanced aileron pivotally mounted adjacent the wing and being curved to coincide with the said curve of the wing, and provisions for limiting the movement of the aileron about its pivot in one direction.

9. A wing for air crafts and the like, said wing having its body formed of a frame and a single rigid surface secured to the frame, the rear of the wing terminating in a rigid curve, an aileron pivotally mounted adjacent the wing and being curved to coincide with the said curve of the wing, and provisions for preventing a movement of the aileron below the plane of the coinciding relation of the curve thereof with the said curve of the wing.

10. The combination of a supporting structure, wings projecting laterally therefrom, said wings having rearward dihedral angles and embodying a body frame, a single rigid surface secured to the lower face of the frame, the wing adjacent the front edge having a deep camber extending uniformly throughout the entire length of the wing, the rear portion of the wing terminating in a rigid negative curve extending uniformly throughout the length of the wing, the leading and trailing edges of the wing being non-flexible, rigid fins depending from the lower face of the wing and extending entirely thereacross, said fins being laterally spaced from each other in a direction lengthwise of the wing, a counterbalanced and rigid aileron pivotally mounted adjacent the rear of each wing and being curved to coincide with the said negative curve of the wing, and a stop for preventing movement of the outer edge of the aileron below the plane of coinciding relation of the curve thereof with the said negative curve of the wing.

In testimony whereof I have signed my name to this specification, in the presence of two subscribing witnesses, on this 22nd day of October A. D. 1913.

THOMAS P. BROOKE.

Witnesses:
J. H. JOCHUM, Jr.,
CHANNING L. SENTZ.